United States Patent [19]

Tawse

[11] 4,297,604
[45] Oct. 27, 1981

[54] AXIAL AIR GAP ALTERNATORS/GENERATORS OF MODULAR CONSTRUCTION

[75] Inventor: Ian S. Tawse, Weston, Canada

[73] Assignee: Gen-Tech, Inc., Miami, Fla.

[21] Appl. No.: 38,251

[22] Filed: May 11, 1979

[51] Int. Cl.³ .......................................... H02K 21/38
[52] U.S. Cl. ..................................... 310/168; 310/268
[58] Field of Search ............... 310/46, 112, 125, 126, 310/216-218, 57, 168, 268, 254, 258, 259, 216, 218

[56] References Cited

U.S. PATENT DOCUMENTS

| | | | |
|---|---|---|---|
| 522,083 | 6/1894 | Paget | 310/168 |
| 579,012 | 3/1897 | Scheefer | 310/168 |
| 2,006,172 | 6/1935 | Klappauf | 310/112 X |
| 3,275,861 | 9/1966 | Goroszko | 310/46 |
| 3,396,296 | 8/1968 | Esters | 310/46 X |
| 3,401,323 | 9/1968 | French | 310/168 |
| 3,467,844 | 9/1969 | Bird | 310/168 |
| 3,912,958 | 10/1975 | Steen | 310/168 |
| 3,992,641 | 11/1976 | Heinrich et al. | 310/168 |
| 4,114,057 | 9/1978 | Esters | 310/46 |

*Primary Examiner*—Donovan F. Duggan
*Attorney, Agent, or Firm*—Alan H. Levine

[57] ABSTRACT

Alternators/generators of axially disposed air gap conformity in which a unique combination of rotors and stators results in machines of high efficiency, simplified modular assembly and extension. Such machines can, moreover, be readily constructed to produce from a single alternator unit multiple voltages and frequencies and from a single generator unit direct current in multiple voltages.

14 Claims, 37 Drawing Figures

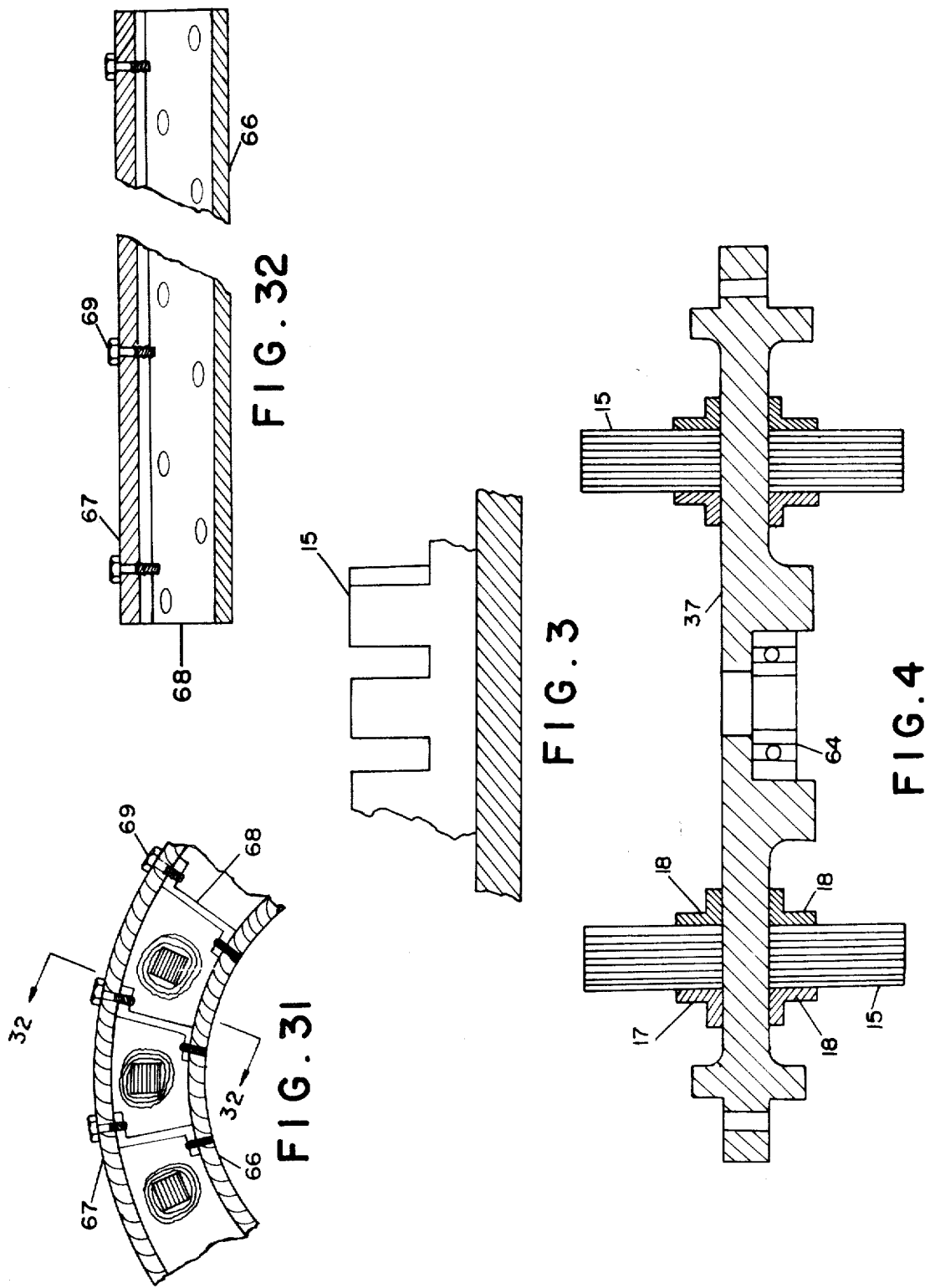

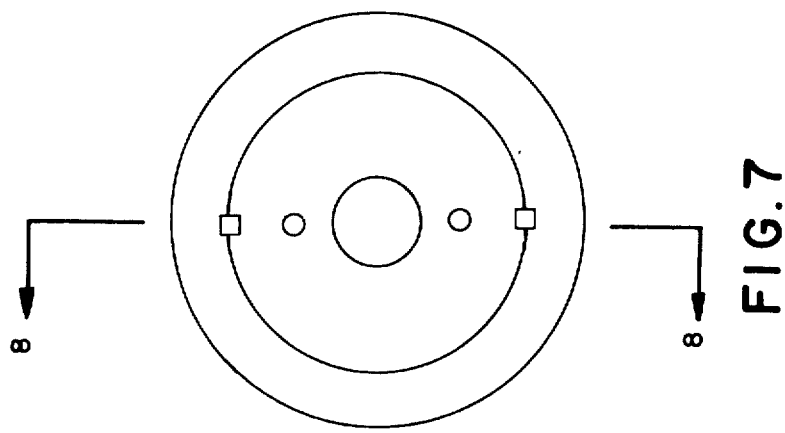
FIG. 7
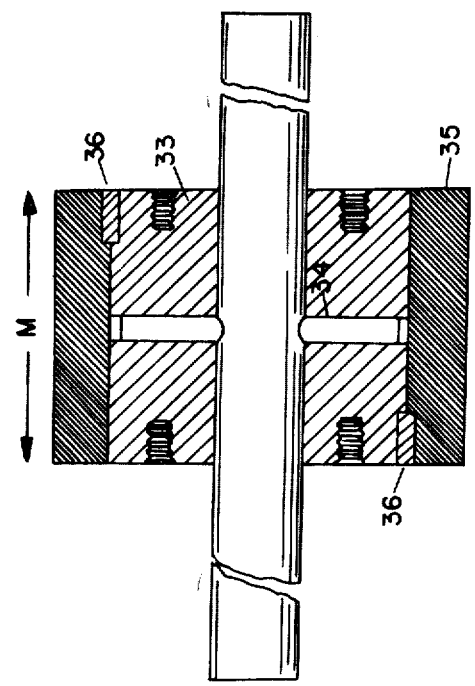
FIG. 8
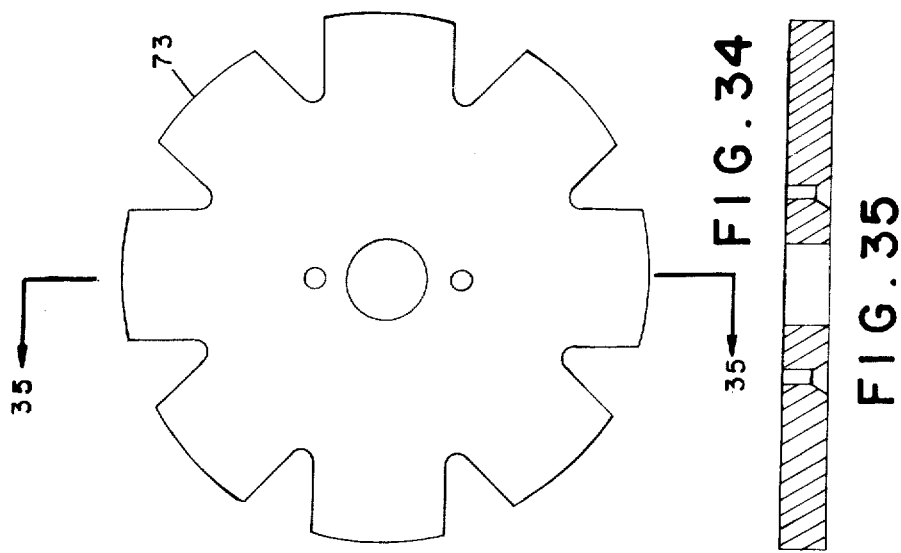
FIG. 34
FIG. 35

BRUSH GEAR AS PER. FIG 1

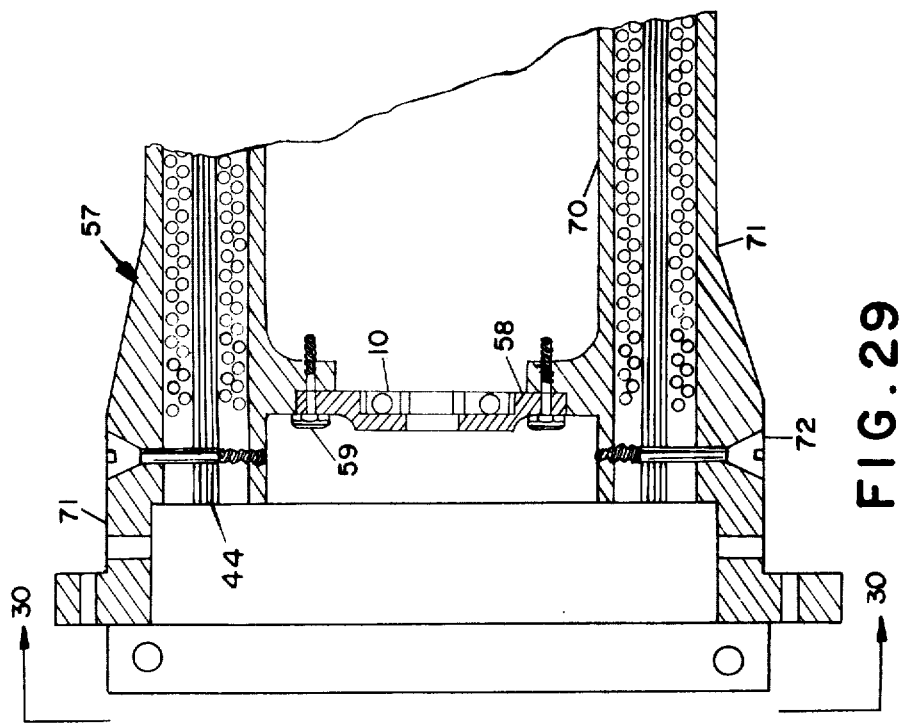
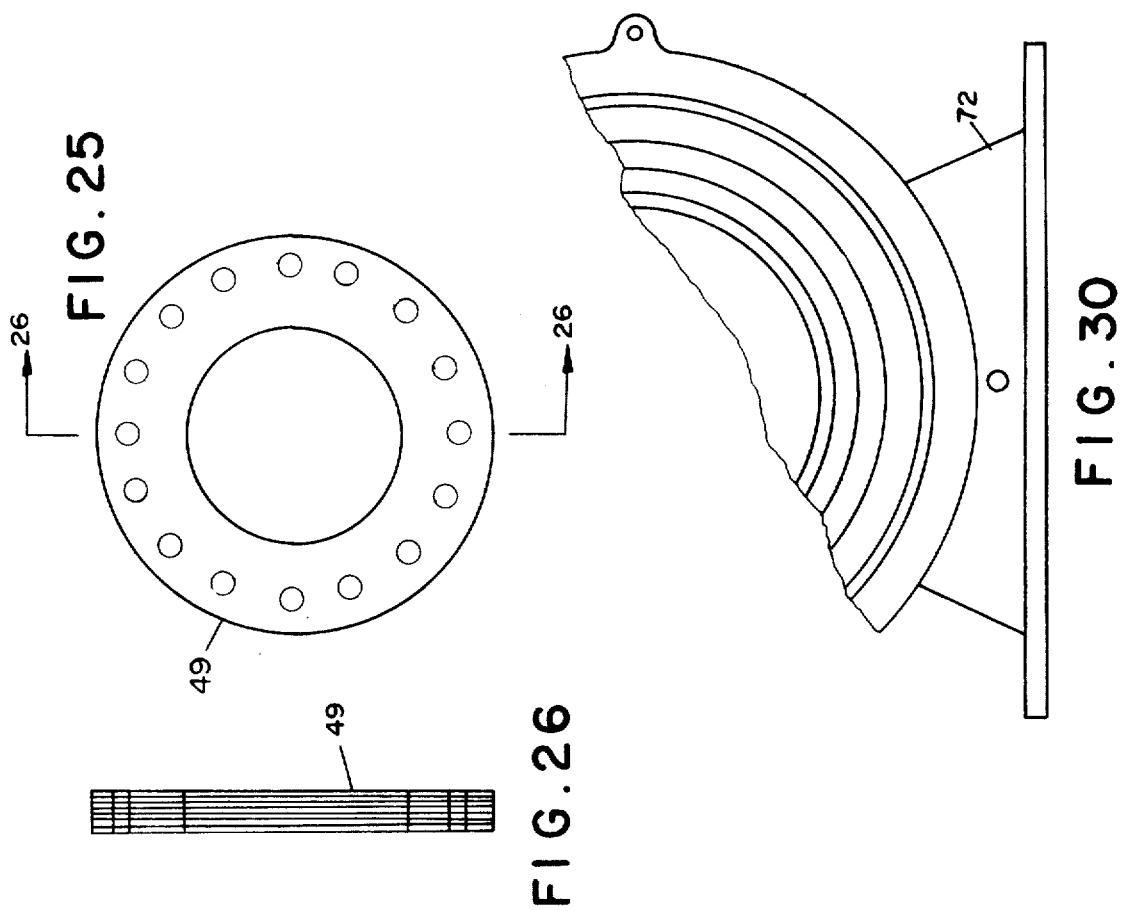

AXIAL AIR GAP ALTERNATORS/GENERATORS OF MODULAR CONSTRUCTION

This invention relates generally to alternators and generators and in particular to the type wherein the cooperating magnetic components of rotor and stator are set apart across an axially disposed air gap.

In keeping with my U.S. patent application Ser. No. 843,936 filed on Oct. 20, 1976, this invention is dedicated to improvements in alternators/generators of the axial air gap type, with said improvements including the following more specific areas of objective endeavor:

Providing the capability to increase the capacity of machines of the type referred to by modular extension, with added modules possessing similar or dissimilar characteristics of voltage, frequency and current to the existing module or modules.

Providing the capability of producing electrical energy of divergent voltages, frequencies and current from single modules.

Providing single units having rotors of both permanent magnet and electromagnet conformity.

Providing multi-pole rotors including high frequency types from a single two pole ring or sleeve type permanent magnet.

Providing multi-pole rotors including a high frequency type from a single coil electromagnet.

Providing magnetic iron of simplified configuration including a castable type.

Providing windings of simplified configuration.

Providing a means of cooling the output windings of an alternator/generator by placing the windings in direct contact with a cooling liquid or gas.

In the invention as outlined within this specification and the accompanying drawings, two cardinal embodiments of the invention are evidenced and will hereinafter be referred to respectively as Embodiment "A" and Embodiment "B", with Embodiment "A" being shown in main in FIG. 1 and Embodiment "B" being shown in main in FIG. 14. In Embodiment "A" the path for magnetic flux return is provided by the stator iron only, while in Embodiment "B" the magnetic flux is in general returned by means of rotor interaction. However, a variant of Embodiment "B" as illustratively shown in FIG. 27 provides means for flux return via the stator iron.

GENERAL DESCRIPTION OF THE DRAWINGS

FIG. 3 is a fragmented view taken on Line 3 of FIG. 2 and shows further detail of the stator iron with the output coils removed.

FIG. 4 is a sectional view on an intermediate stator plate and includes details of the stator iron and securing means for same. This detail is applicable to Embodiment "A" only.

FIG. 7 is an end view on a shaft, non magnetic spacer and ring type permanent magnet for a permanent magnet type rotor and is applicable to both Embodiments "A" and "B" of the invention.

FIG. 8 is a longitudinal sectional view taken on Line 8 of FIG. 7.

Figure 14:
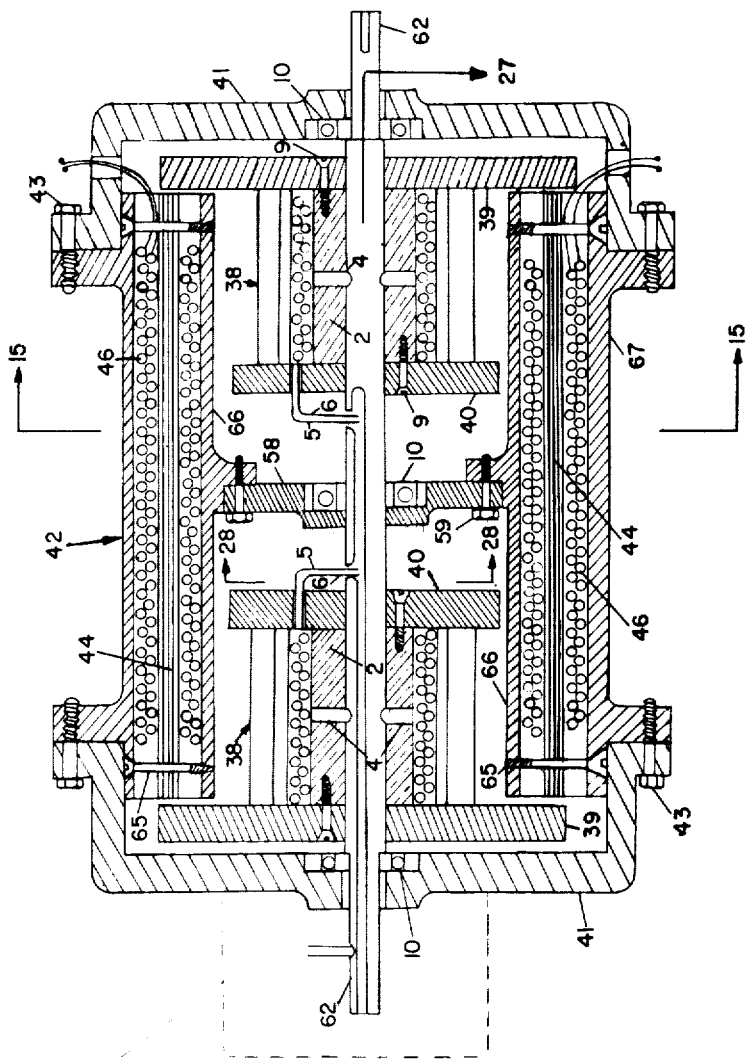
FIG. 14 is a longitudinal sectional view showing the salient components and their relationship to each other as applies to Embodiment "B" of the invention.
Figure 15:
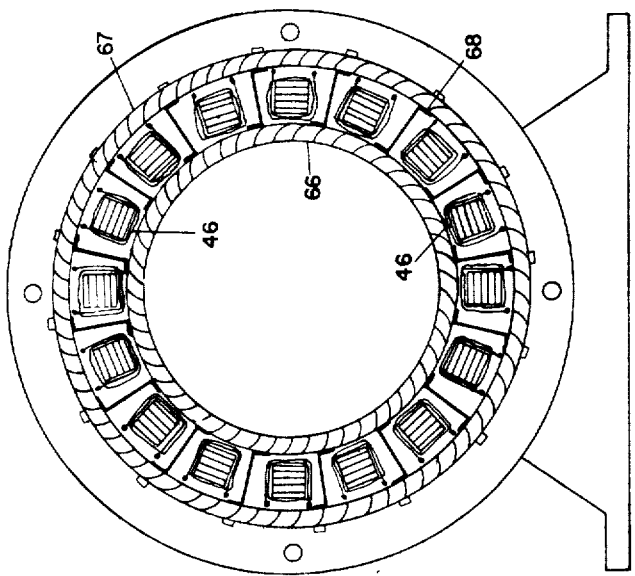

FIG. 15 is a cross sectional view taken on Line 15 of FIG. 14 for the purpose of showing the radial orientation of the stator iron and coils and their location within the unit's casing. In the interest of clarity the unit's rotor has not been shown in this view. FIG. 15 applies only to Embodiment "B" of the invention.

Figure 16:
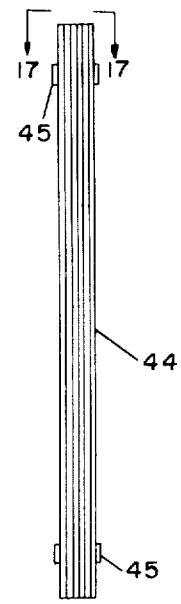

FIG. 16 is a side view on a stator iron "bundle" for a multiple rotor machine of Embodiment "B" conformity.

Figure 17:

FIG. 17 is an end view on FIG. 16 as viewed on Line 17.

Figure 18:
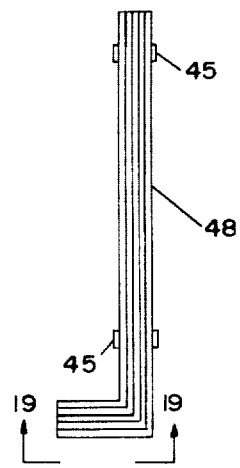

FIG. 18 shows a stator iron "bundle" for a single rotor machine of Embodiment "B" conformity.

Figure 19:

FIG. 19 is an end view on FIG. 18 as taken on Line 19.

Figure 20:
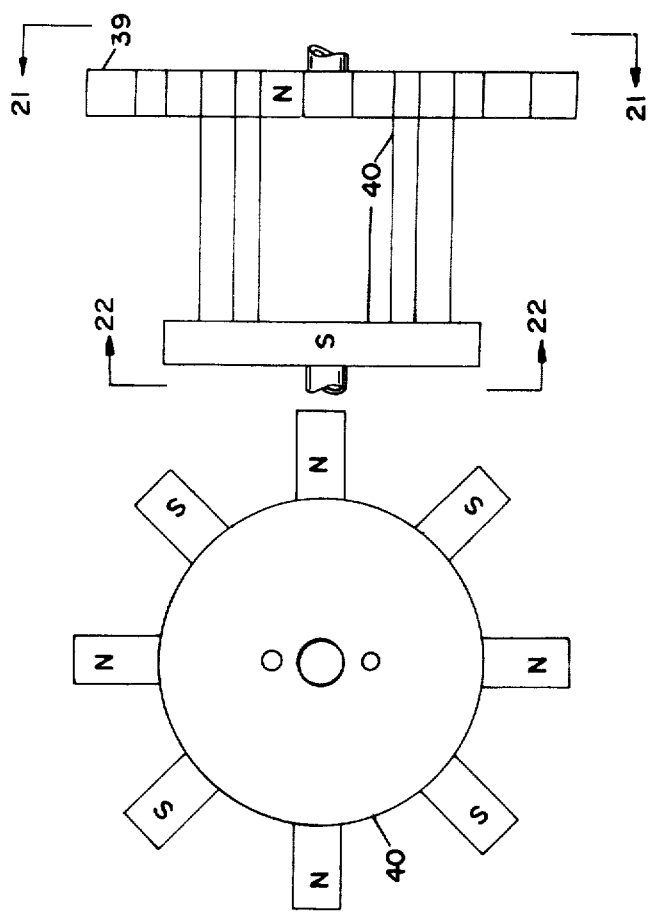

FIG. 20 is a side view of a rotor pole unit assembly applicable to Embodiment "B" of the invention.

Figure 21:
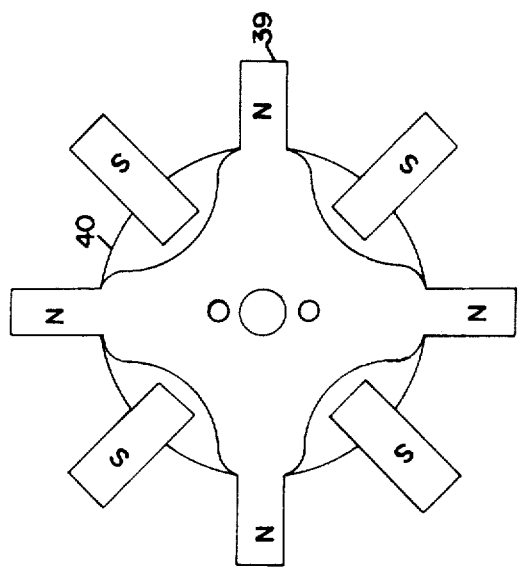

FIG. 21 is an end view on FIG. 20 as taken on Line 21.

Figure 22:
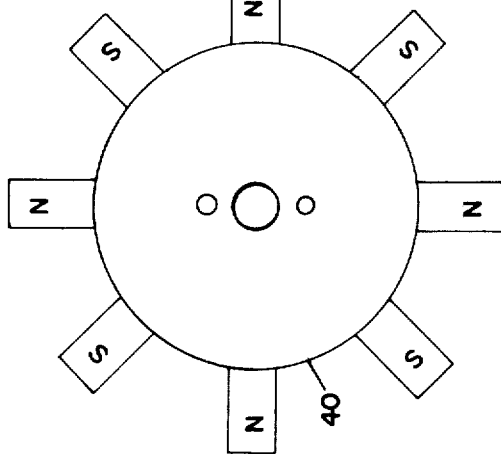

FIG. 22 is an end view on FIG. 20 as taken on Line 22.

Figure 23:
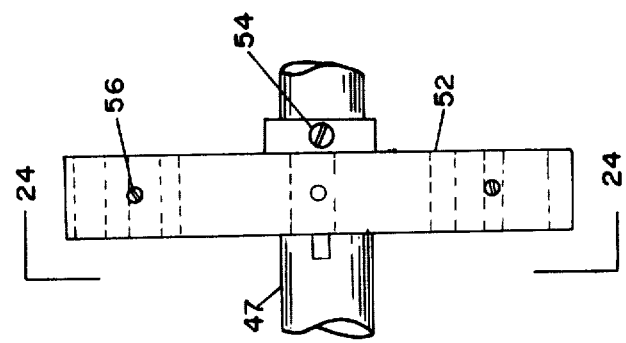

FIG. 23 is a side view of a permanent magnet type rotor applicable to both Embodiments "A" and "B" of the invention.

Figure 24:
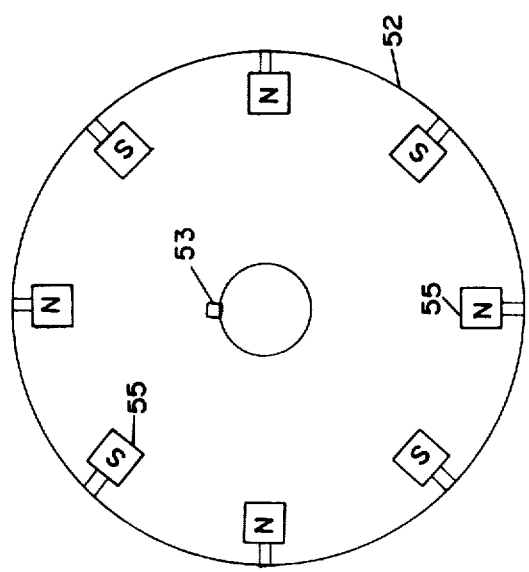

FIG. 24 is a face view on FIG. 23 taken on Line 24.

FIG. 25 is a front view on a flux return ring of laminated construction and applicable to Embodiment "B" of the invention.

FIG. 26 is a longitudinal sectional view on FIG. 25 taken on Line 26.

Figure 27:
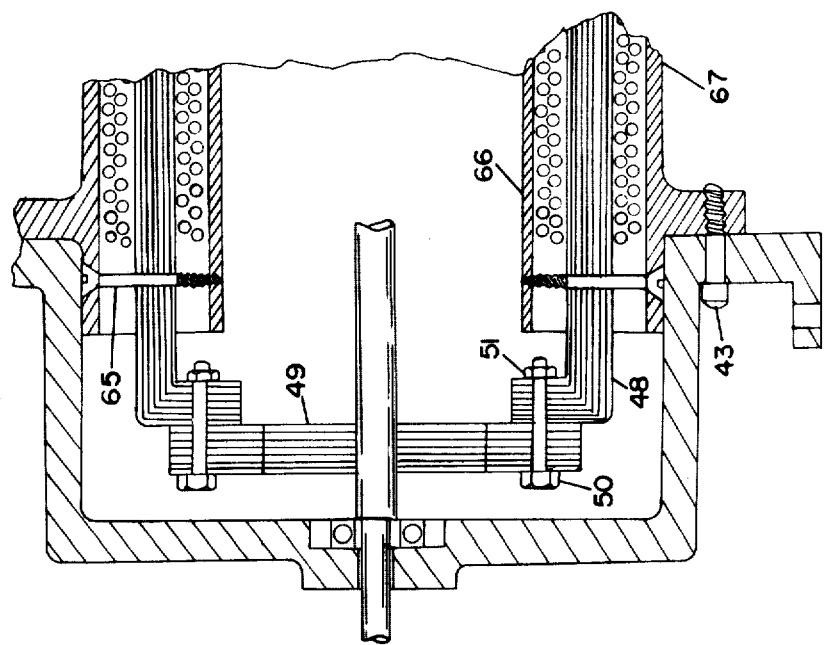

FIG. 27 is a fragmented sectional view generally on Line 27 of FIG. 14 and supplements FIG. 14 to the extent that it shows a flux return ring in location and moreover provides detail of the machine's support foot which forms an integrated part of the end cap.

Figure 28:
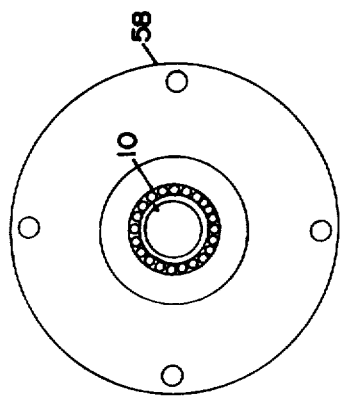

FIG. 28 shows an intermediate rotor support as would be generally viewed on Line 28 of FIG. 14. This figure is applicable to Embodiment "B" of the invention only.

FIG. 29 is a longitudinal fragmented section showing details of a casing end which has been modified to allow for modular extension of a machine constructed in accordance with Embodiment "B" of the invention.

FIG. 30 is a fragmented view taken on Line 30 of FIG. 29 and mainly serves to show detail of the machine's support foot incorporated in the casing end as reflected in FIG. 29.

FIG. 31 is a fragmented cross sectional view on the casing of a machine of Embodiment "B" conformity, and shows the means of securing the outer casing to the inner casing.

FIG. 32 is a longitudinal sectional view taken on Line 32 of FIG. 31 showing additional detail to that given in FIG. 31.

Figure 6:
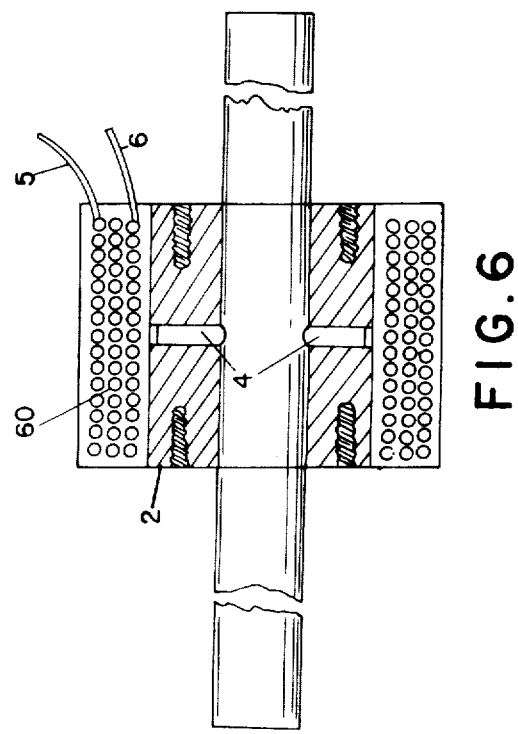
FIG. 6 is a longitudinal sectional view taken on Line 6 of FIG. 5.
Figures 12, 13:
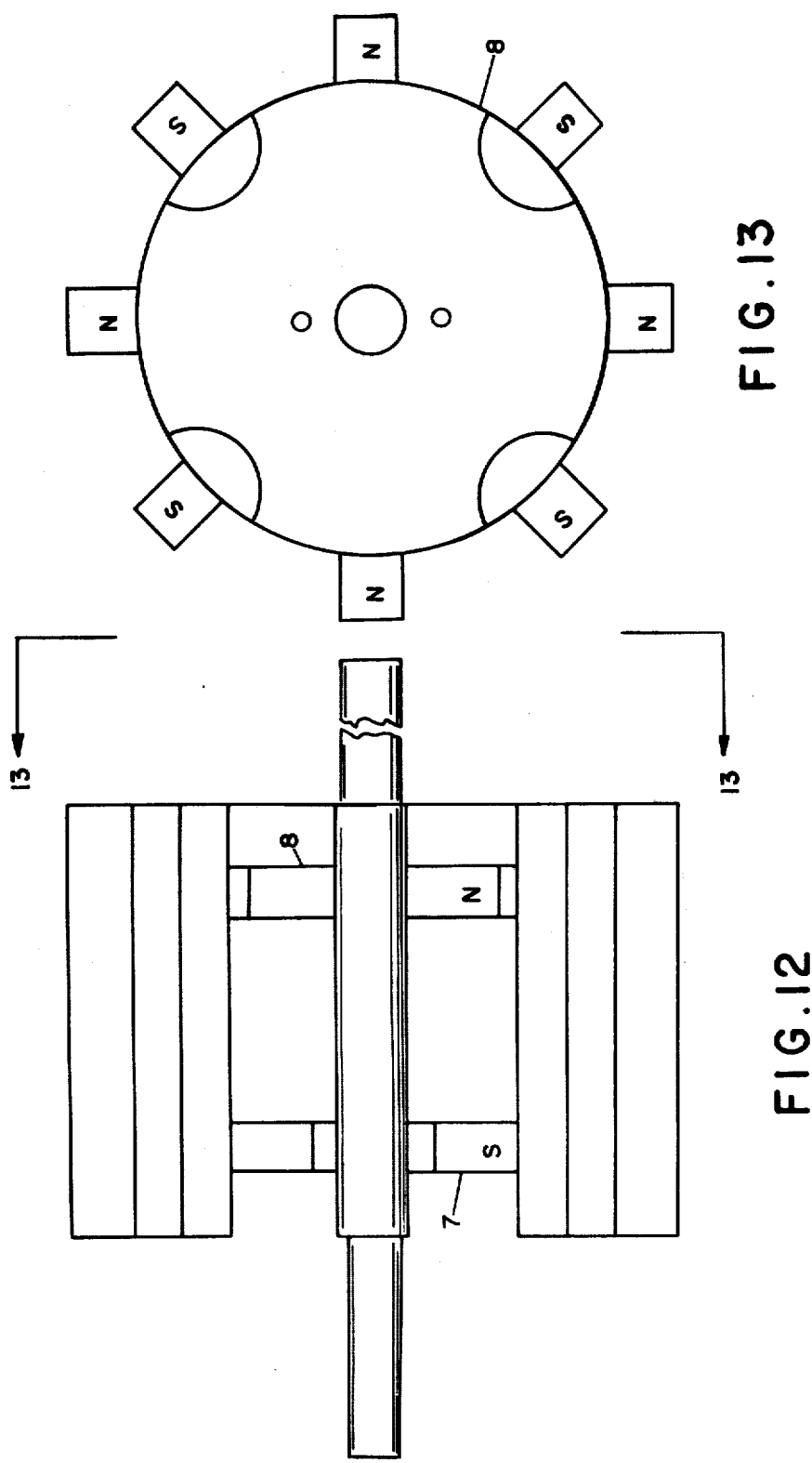
FIG. 12 is a side view on a rotor pole unit for a multiple stator machine of Embodiment "A" conformity.
FIG. 13 is an end view on FIG. 12 taken on Line 13.
Figure 33:
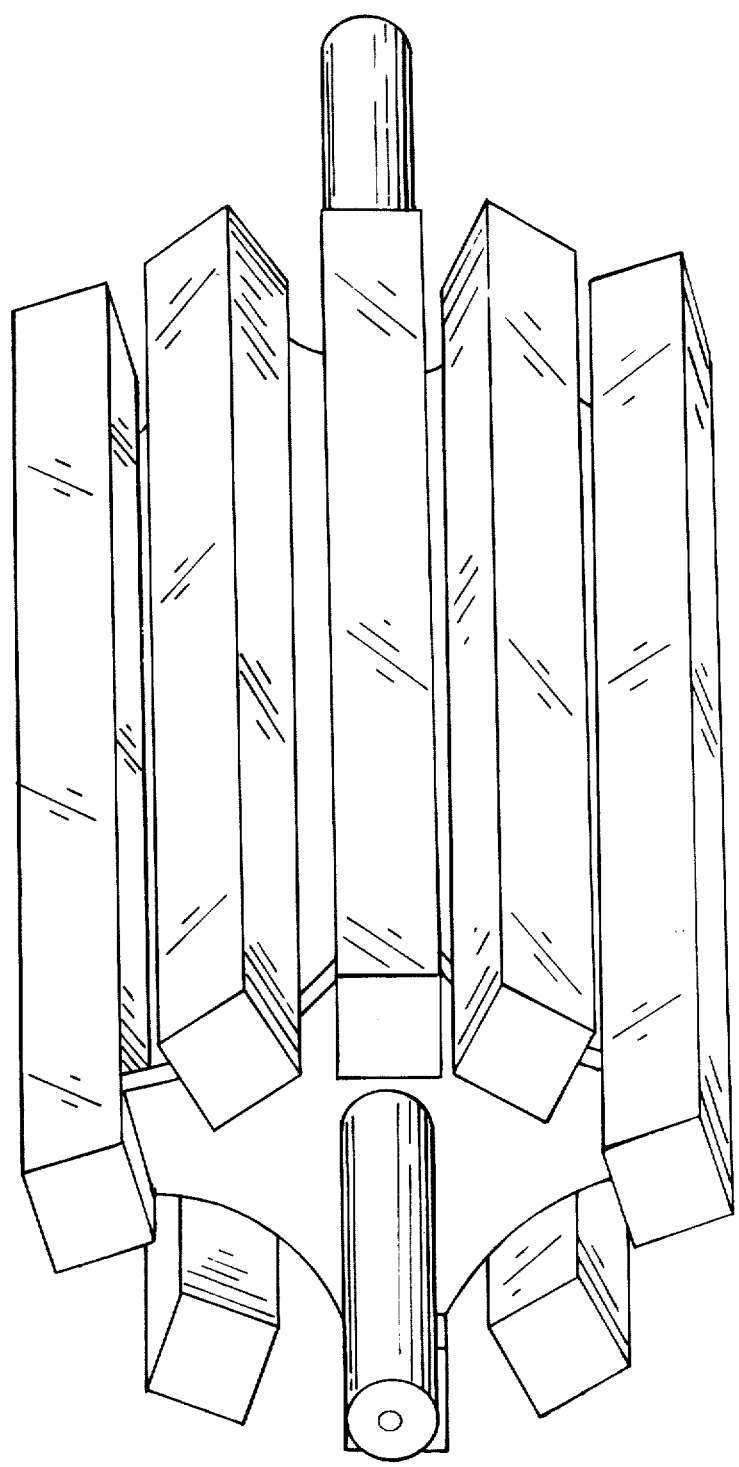

FIG. 33 is an isometric view of a rotor pole unit assembly of the type shown in FIG. 12 and which has been provided in order to show greater detail of the means whereby dissimilar polarities are obtained at one face of a basic electromagnet as shown in FIGS. 6 and 8.

FIG. 34 is a front view showing details of a rotor pole unit to be used in a machine of Embodiment "B" conformity for the production of direct current electricity.

FIG. 35 is a cross sectional view on FIG. 34 as taken on Line 35.

Figure 36:
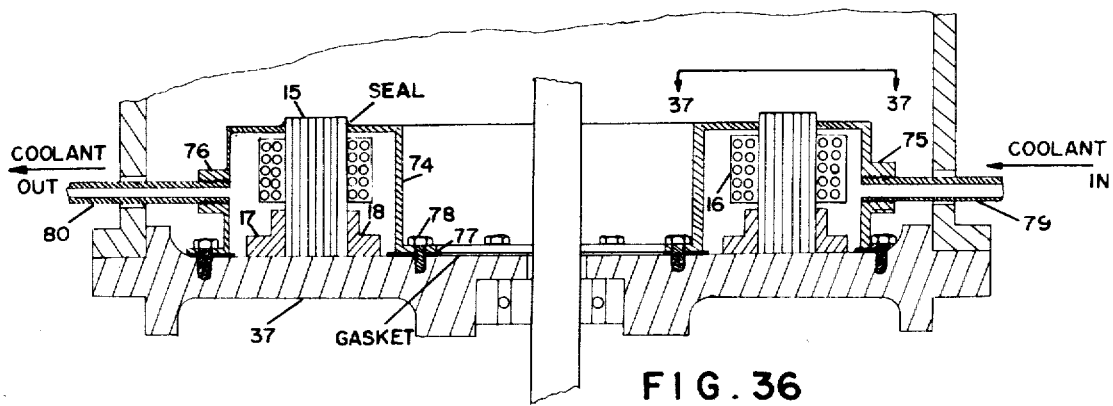

FIG. 36 is a sectional view on a stator plate and shows means whereby a coolant can be placed in contact with the output coils or windings of a machine of Embodiment "A" conformity.

Figure 37:
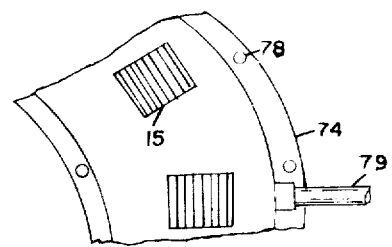

FIG. 37 is a fragmented view taken on Line 37 of FIG. 36.

DETAILED DESCRIPTION OF THE DRAWINGS AND EMBODIMENTS OF THE INVENTION

Figure 1:
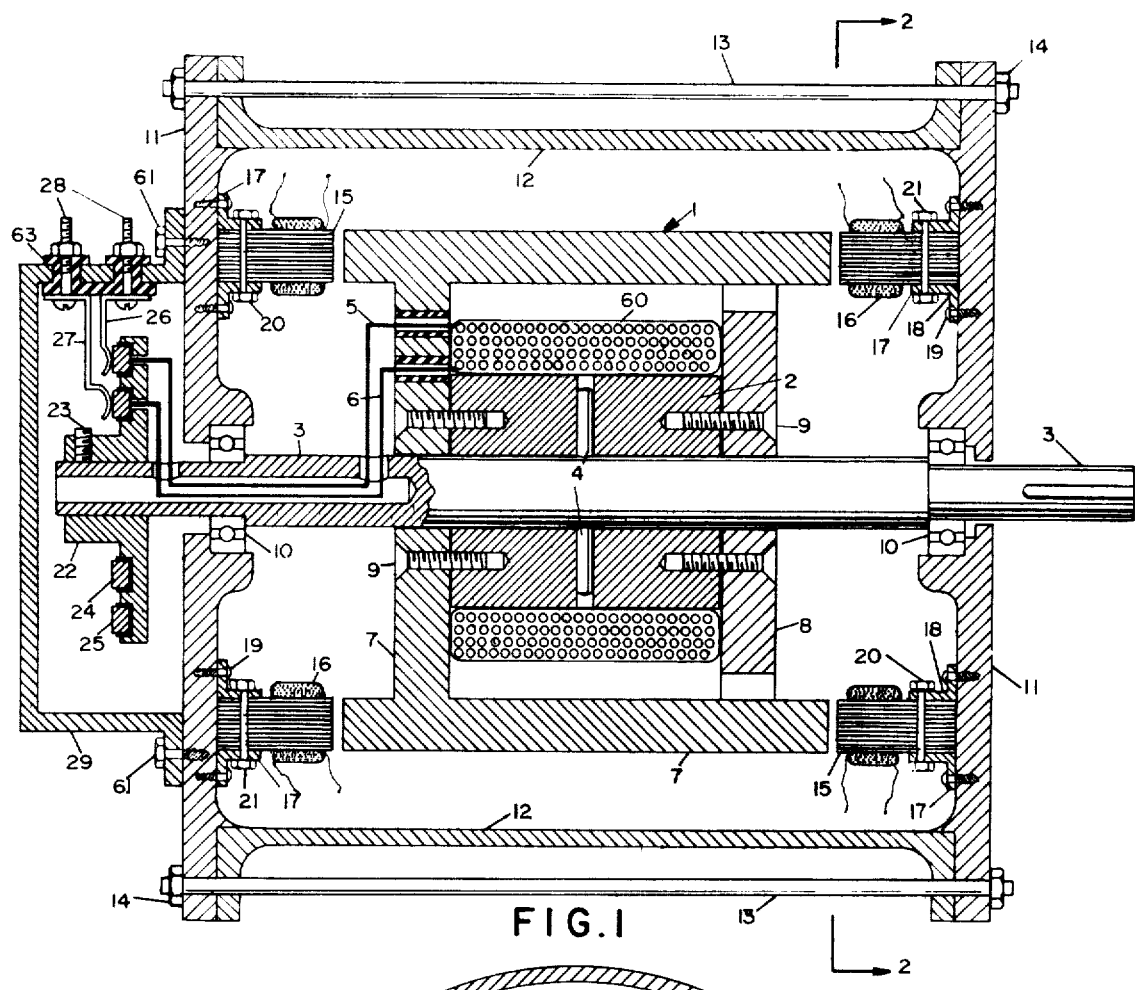
FIG. 1 is a longitudinal sectional view showing certain principal features of the invention as applied to Embodiment "A". The magnetic field herein is indicated as being furnished by an electromagnet.

In FIG. 1 of the drawings the main components of an alternator/generator of Embodiment "A" conformity are shown with said components being located in functional relationship to each other.

Figure 2:
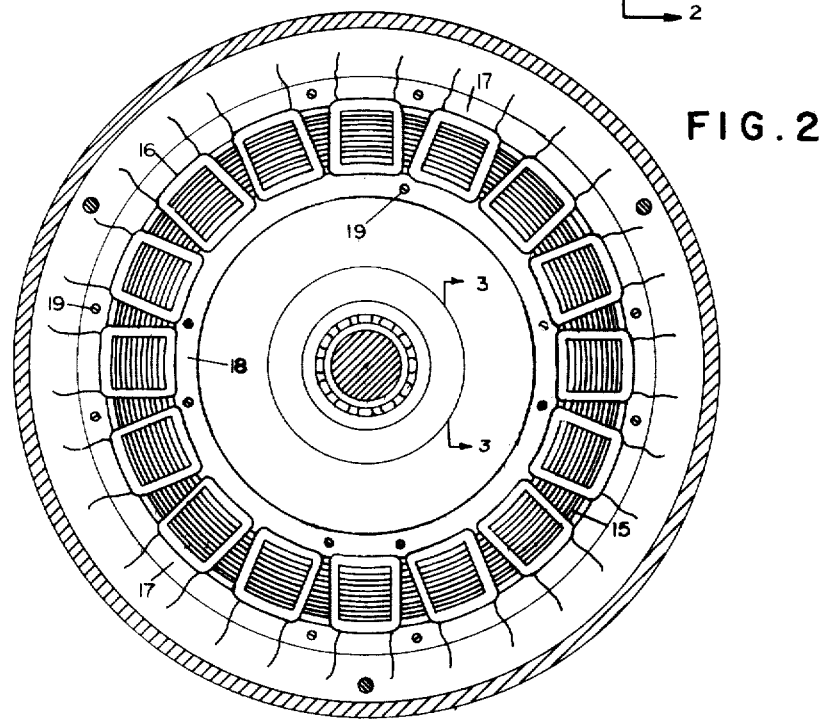
FIG. 2 is a cross sectional view taken on Line 2 of FIG. 1 for the purpose of showing the radial orientation and location of the stator iron and coils.

A casing 12 of cylindrical conformity has its ends prepared to receive and accomodate end plates 11, said end plates being of a non magnetic material and serving the multiple purposes of structurally supporting casing 12, retaining bearing means 10 and structurally supporting and retaining a ring of laminated magnetic metal 15 hereafter referred to as the "stator iron", said stator iron 15 being secured to the end plate 11 via the medium of stator iron securing ring (outer) 17 and stator iron securing ring (inner) 18, said rings 17 and 18 being constructed of non magnetic material and fastened to end plate 11 by securing screws 19. The stator iron 15 is in turn retained between securing rings 17 and 18 by bolt 20 and nut 21, both of said items being of non magnetic material. A study of FIGS. 1 and 2 will further show that stator inductor coils 16 are wound about the teeth of the stator iron 15, said teeth being shown in greater detail in FIG. 3. Referring again to FIG. 1 it will be noted that bearing 10 locates and retains a rotatable shaft 3 of non magnetic material to which a rotor assembly 1 of the electromagnetic type is secured by retaining screws 4, said screws being of magnetic material.

Figure 5:
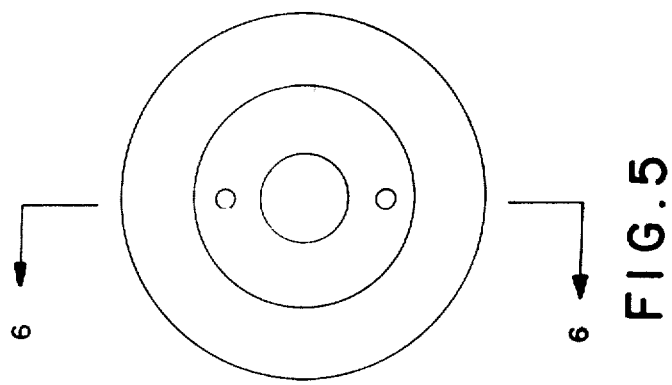
FIG. 5 is an end view on a shaft, solecore and field coil assembly for an electromagnetic rotor and is applicable to both Embodiments "A" and "B" of the invention.

In considering the construction of the rotor assembly 1, FIGS. 5 and 6 detail a solecore 2, of magnetic material, having a coil of wire 60 wound about its periphary and across its length for the purpose of co-operating with the solecore 2 to create a magnetic field, the north-to-south and south-to-north orientation of which would parallel the rotor shaft 3. Coil 60 is provided with terminals 5 and 6 which are led through a hollow section of shaft 3 to brush gear rings 24 and 25 which are retained by an insulating cement (not enumerated) in a ring gear body 22 which in turn is secured to rotatable shaft 3 by securing screw 23. Direct current electrical supply to coil 60 is led (from a source not shown) to brush gear rings 24 and 25 via terminal posts 28 and brushes 26 and 27. All brush gear components are protected by brush gear cover 29 which is secured to end plate 11 by securing screws 61. Brush gear terminal posts 28 are insulated from brush gear cover 29 by insulator 63.

In order to usefully direct the magnetic field eminating from the basic two-pole, two-pole face magnet formed by the cooperation of field coil 60 and solecore 2, a pair of special rotor pole units 7 and 8 (shown in FIG. 12) of magnetic material have been provided and secured to the pole faces of solecore 2 by securing screws 9. The rotor pole units 7 and 8 are constructed as follows:

A disc which has its diametrical dimension placed at 90° to the longitudinal axis of solecore 2, incorporates substantially at its periphery a plurality of fore and aft directed fingers of square or rectangular cross section, said fingers being radially disposed with regard to the longitudinal center line of solecore 2 and equally spaced about said disc's periphery.

By reference to FIGS. 1 and 12 it will be noted that the above referred to fingers are of unequal extension fore and aft of the faces of the disc with which they are integrated, and have their major length of extension equal to the longitudinal dimension of the solecore 2 plus the dimension of the reciprocal extension as measured from the face of the disc establishing contact with the pole face of solecore 2. By referring to FIGS. 12 and 13 it will, moreover, be noted that crescent shaped openings are in evidence in that portion of the pole unit disc located adjacent to its periphery, and with the radial center lines of said openings being spaced at equal distance between each pair of fingers integrated with the disc in which the openings are evidenced. The purpose of the afore discussed openings is to receive the fingers or poles, of a pole unit of equated physical structure, located at the opposite end of the solecore 2 and secured thereto.

Since the fingers of the pole units located at opposite ends of the solecore 2 will obviously be of opposite polarities, the crescent shaped openings are dimensionally calculated to eliminate magnetic short circuiting and to minimize flux leakage between pole assemblies.

In function as a multi-pole rotor assembly 1 of the electromagnetic type, the magnetic field eminating from the north pole of solecore 2 (the appropriate direction of winding field coil 60 being observed) is transferred to the disc portion of rotor pole unit 8 from which the field then flows via the pole fingers of said rotor pole unit 8 in both directions of extension of said fingers, then flows to the south pole face of solecore 2 via the air gap at both stators, aligning teeth of the stator iron 15, and fingers of rotor pole unit 7. It will be noted that while the fore and aft extension of any pole finger is unequal, the total distance of flux flow from a north to a south pole transverses an equal distance and an equal volume of magnetic material. The reluctance of the magnetic circuit is therefore in balance.

Figure 10:
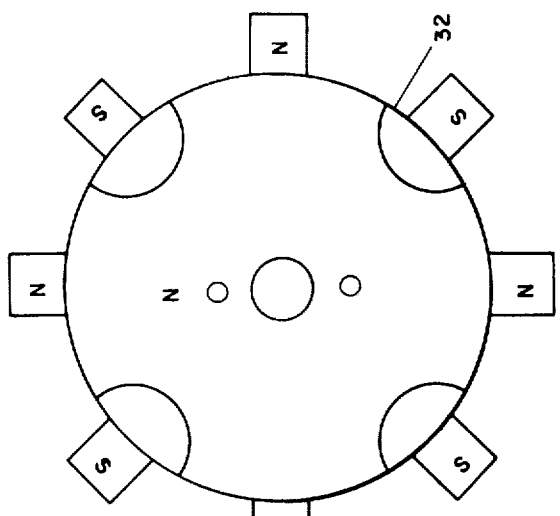
FIG. 10 is an end view on FIG. 9 taken on Line 10.
Figure 9:
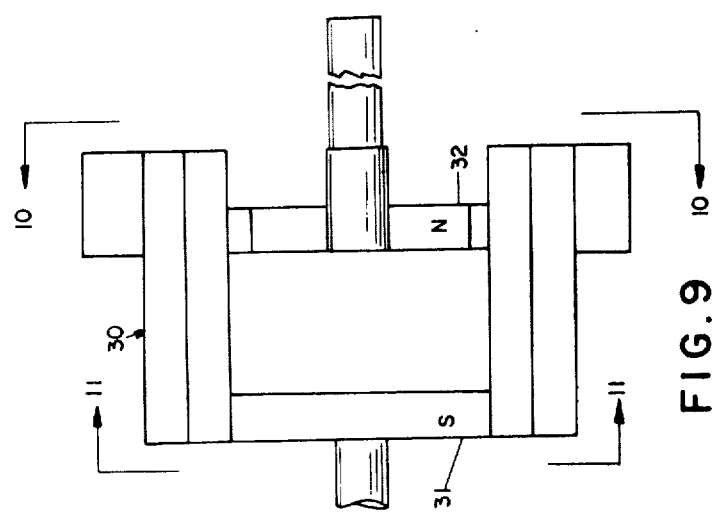
FIG. 9 is a side view on a rotor pole unit for function in a single stator machine of Embodiment "A" conformity.
Figure 11:
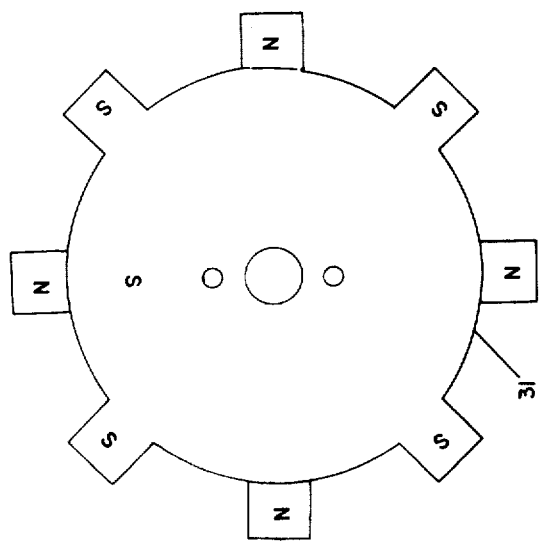
FIG. 11 is an end view on FIG. 9 taken on Line 11.

FIGS. 9, 10, and 11 reflect a modified version of the rotor pole unit as afore discussed and as shown in FIGS. 1, 12, 13 and 33. The modified version, comprising part of rotor assembly 30, is designed for operation in machines of single stator conformity and varies from the earlier discussed pole units 7 and 8 mainly in that the pole fingers extend in one common direction only from the disc portions with which they are integrated. The individual rotor pole units enumerated 31 and 32 respectively, moreover have pole fingers of unequal length, 31 having the longer fingers in view of their having to traverse the length of the solecore 2, in order to maintain the pole faces of both magnet polarities in a common plane. It should be noted that the modified pole units 31 and 32 have been conceptually structured to utilize the same solecore 2, and field coil 60, as rotor pole units 7 and 8 in order to form a complete electromagnet assembly 30 as required in the function of an alternator/generator variant of Embodiment "A" of the invention. Both rotor pole units 31 and 32 are secured to solecore 2 by securing screws 9.

A modification to both types of rotors as previously described is as follows:

A spacer sleeve of non magnetic material 33, as shown in FIGS. 7 and 8 is substituted for solecore 2 and is affixed to rotatable shaft 3 by securing screws 34, said securing screws also being of a non magnetic material. A permanent magnet of ring or sleeve conformity 35, suitably dimensioned and magnetized in the direction indicated thus "←M→" and being of material such as cast Alnico VIII (but not necessarily restricted to same) is substituted for field coil 60 and is secured to spacer sleeve 33 by tapered keys 36. In this modification to the rotors as previously discussed, rotor pole units 7, 8, 31 and 32 remain unchanged and said units would be secured to spacer sleeve 33 by securing screws 9. By the substitution of spacer sleeve 33 and permanent magnet 35 for solecore 2 and field coil 60, field coil terminals 5 and 6, brush gear rings 24 and 25, ring gear body 22, securing screw 23, brushes 26 and 27, brush gear terminal posts 28, brush gear cover 29, securing screws 61 and insulator 63 are eliminated from function in an alternator/generator of Embodiment "A" conformity.

Yet another type of rotor highly suitable for providing the necessary magnetic field for an alternator/generator of Embodiment "A" conformity is shown in FIGS. 23 and 24. In this latter instance, a disc of non magnetic material 52 has a plurality of permanent magnets 55, of square or rectangular cross sectional geometry, approximating in said geometry and area, the cross sectional geometry and area of the stator iron teeth. Said permanent magnets 55 being longitudinally dimensioned in accordance with design conditions and the individual permanent magnets 55 located in suitably sized openings arranged on a pitch circle substantially coincident with the pitch circle of the stator iron 15. The permanent magnets 55 are retained in their accomodating openings by securing screws 56, said securing screws being of non magnetic material. By referring to FIG. 24 it will be seen that the permanent magnets 55 are of an equal angular disposement about the faces of disc 52 and are of alternating magnetic polarities.

In utilizing a rotor of the type last described within the confines of an alternator/generator of Embodiment "A" conformity, the previously described rotors, shafting and brush gear components would be excluded from the assembly and replaced with a permanent magnet type rotor 52, said rotor incorporating in its structure a hub and keyway as shown in FIGS. 23 and 24. In an operable installation, rotor 52 would be affixed to a suitably dimensioned rotatable shaft 47 by means of key 53 and securing screw 54. Shaft 47 would be located and retained by bearing means 10. Such an installation in combination with suitably dimensioned casing 12 and tie rods 13 would place the rotor 52 in a centralized position between stator iron 15 located at both ends of the alternator, in which position the rotor when revolved by a suitable driver would cooperate with other system components for the production of usable electrical energy.

In considering the four rotor types dealt with in the foregoing, it will be apparent to those skilled in the alternator/generator art that adequately constructed rotors of the conceptual principles afore discussed, having their poles placed in rotational coincidence with stator iron as aforedescribed and detailed in the drawings, will adequately cooperate with said stator iron to produce a magnetic flux within the teeth or poles of the stator iron which in turn will react with the induction coils 16 to produce electrical energy in the form of alternating current.

In order to reduce manufacturing costs and expedite unit assembly on a machine of Embodiment "A" conformity, the following means of increasing output capacity by simple addition of standardized components has been developed and is a feature of this invention.

In FIG. 4 a stator plate 37 of general configuratory similarity to stator plate 11 is indicated. It will be noted however, that plate 37 has both of its faces prepared to receive a casing section 12 and has stator iron 15 secured to both of its faces by securing rings 17 and 18, and a bearing 64 is moreover positioned and retained in accordance with details indicated for end plate 11. In order to increase the output capacity of a machine by modular extension, one end plate 11 would be omitted from a unit assembly and replaced with an intermediate stator plate 37. If the unit to be extended employs a rotor of the electromagnet type, the omitted end plate 11 would be the one at the opposite end to the machine's brush gear assembly. In all instances of modular extension the unit's shaft 3, or 47, dependent upon the type of rotor to be used, would be suitably extended in its longitudinal dimension and in the case of a shaft for a machine utilizing a rotor of the electromagnetic type, the hollow section which accomodates the rotors' terminal leads 5 and 6 would also be suitably extended. With the installation of a suitably extended shaft 3 or 47, and having located and secured same at one end of the machine, in an end plate 11, said end plate being located in suitable relationship to a casing segment 12, a rotor of the required type would then be located and secured to the unit's shaft, and intermediate stator plate 37 would now be installed, followed by a further rotor of suitable conformity, and in the case of a machine of two rotor/four stator configuration, a suitably dimensioned casing segment 12 and a further end plate 11. Casing segment 12, stator end plates 11 and intermediate stator plate 37, would now be secured by properly dimensioned tie rods 13 together with securing nuts 14. In an assembly as last described, it should be noted that rotor stability is virtually assured by the intermediate bearing 64, and assuming equal air gaps between the faces of the rotor and stator iron, no end loads would be imposed upon the bearings 10 and/or 64.

In the example of modular extension cited in the foregoing, a situation considering a two rotor/four stator unit has been dealt with, but it would be obvious that unit extensions exceeding the quantity of rotors and stators cited in the example is possible, but in such instance, longitudinal reinforcement of a unit's casing (not shown) would be required to establish structural stability of a machine of yet further extended modular configuration. It would also be apparent that by omitting stator iron 15, induction coils 16, stator iron securing rings 17 and 18 together with securing screws 19, bolt 20 and nut 21 from one end plate 11 and utilizing a rotor assembly 30, of a permanent magnet type rotor 52, in conjunction with a suitably dimensioned casing 12 and likewise suitably dimensioned tie rods 13, a foreshortened single stator machine would be constructable. Moreover in constructing a machine of modular extension, it would also be apparent that rotors of divergent types and/or of different pole numbers could readily be incorporated in a single assembly making practical a wide variety and range of output conditions.

A further feature of the invention as applicable to Embodiment "A" of same is a means whereby cooling of the machine's output coils can be achieved.

In FIG. 36 a typical stator plate 37 is indicated, said plate carrying stator iron 15, stator iron securing rings 17 and 18 together with output coils 16. It will be noted however that said items 15, 16, 17 and 18 have now been enclosed within a coolant containment area bounded in main by stator plate 37, gasket 77 and coolant containment channel 74, said coolant containment channel 74 (constructed of non magnetic material) and gasket 77 being secured to stator plate 37 by securing screws 78. By further reference to FIGS. 36 and 37, the latter figure serving to further detail the means whereby cooling of the output coils can be achieved, it will be discerned that the containment channel 74 comprises a channel of "doughnut" conformity having a plurality of openings cut in the web member of said channel in order to receive the fingers of the stator iron 15, while the channel sides at its open end bear outwardly directed integrated flanges encompassing the total developed length of the channel, said flanges being in purpose designed to facilitate the securing of the said containment channel 74 to the stator plate 37. The containment channel 74 is moreover provided with a coolant inlet connection 75 and a coolant outlet connection 76, both connections being integrated with said containment channel 74 and provided with means for receiving the threaded ends of pipes functioning to supply and discharge the coolant received in the containment area.

In a machine provided with cooling means as described herein, the stator iron 15 and output coils 16 would be enclosed in an envelope of epoxy prior to their being integrated with the stator plate 37 following which the containment channel 74 would be located in position with gaskets 77 being located between the flanges of said containment channel 74 and the stator plate 37. The containment channel 74 would now be secured to the stator plate 37 by securing screws 78, and a fillet of epoxy would be applied to all areas of intersection between the stator iron teeth and the web of the containment channel 74 thereby forming a sealed containment area except for the inlet and outlet connections enumerated 75 and 76 respectively.

Having secured the containment channel 74 in the manner as last described, a coolant inlet pipe 97 supplying coolant (from a source not shown) and a coolant outlet pipe 80 discharging the warmer coolant, both having ingress to the containment channel 74 through suitably dimensioned openings in casing 12 are threaded into coolant inlet and outlet connections 75 and 76, thereby completing the construction of means whereby cooling of the output winding of a machine of Embodiment "A" conformity can be achieved.

In consideration of the coolants utilizable for the system as afore described, it would be apparent that fluids in either liquid or gaseous states could be effectively used provided adequate attention was given to details of temperature, velocity and flow volume.

It should be noted that while the example of system cooling means dealt with in the foregoing refers to and details cooling of the output coils on one side of a stator plate 37 only, it would be readily understandable that such cooling means could be applied to both sides of an intermediate stator plate 37 and/or to a stator end plate 11, thereby making possible the cooling of the output coils in alternators/generators of modular extension.

In FIG. 14 a longitudinal cross sectional view of the second major embodiment of the invention hereafter referred to as Embodiment "B" is shown. In this view certain major components of this latter embodiment of the invention are shown in their relationship to each other.

In the afore referred to FIG. 14 a casing assembly 42, of non magnetic material is indicated, said casing comprising an inner section 66 of elongated cylindrical form, contained within the confines of a radially set apart outer section 67, also of elongated cylindrical form, but having a pair of flanges encircling its periphery, said flanges being located in near proximity to its ends and having a plurality of tapped holes disposed about their faces for the purpose of receiving bolts used to secure the machine's end closure means 41 to the casing assembly 42. Also included in the casing assembly 42, is a plurality of "Z" shaped rib members of non magnetic material 68, such rib members having a longitudinal dimension substantially equal to the longitudinal dimension of the casing inner and outer sections 66 and 67. The said rib members 68 are shown in FIGS. 31 and 32 and function to maintain apart casing sections 66 and 67, and are in radial dispersement equidistant within the area separating the inner and outer casing sections 66 and 67. By further reference to FIGS. 31 and 32 it will be noted that rib member 68 is secured to inner casing section 66 by spot welding and secured to casing outer section 67 by a plurality of securing bolts 69, said bolts being the fourth and final item comprising the casing assembly 42.

In FIGS. 16 and 17 a "bundle" of laminated magnetic iron 44 is indicated, said magnetic iron being equal in its longitudinal dimension to that of casing assembly 42, and in cross sectional geometry being substantially of rectangular conformity. FIG. 16 also indicates that the magnetic iron "bundle" 44 is maintained in unitary assembly by retaining rivets 45, said rivets being of non magnetic material. By referring again to FIGS. 14 and 15 it will be noted that a plurality of laminated magnetic iron "bundles" 44, having first had an induction coil 46 wound about their outside surfaces, have been located in the open area lying between the inner and outer casing sections 66 and 67 of casing assembly 42, and retained therein by retaining screws 65, said screws being of non magnetic material.

The combined magnetic iron "bundles" 44 and induction coils 46 are in equal radial dispersement between the inner and outer casing sections 66 and 67 of the casing assembly 42; and, in longitudinal location, the fore and aft faces of the iron "bundles" 44 are in coincidence with the ends of the casing assembly 42.

By referring again to FIG. 14 it will be seen that twin rotor assemblies 38, said rotor assemblies being of the electromagnetic type, are provided in order to furnish the necessary magnetic flux for interaction with the magnetic iron 44, and induction coils 46, in order to effect the generation of electrical energy. In considering the construction of a rotor assembly 38, of the electromagnetic type as shown in FIG. 14, a solecore 2 and a field coil 60 as shown in FIGS. 5 and 6, and as previously described in relationship to Embodiment "A" of the invention, are suitably affixed to a rotatable shaft 62, said shaft being of suitable dimension and provided with a hollow section in order to accomodate the terminal leads 5 and 6 of the field coil 60, said leads being for the purpose of supplying direct current electrical energy from a brush gear apparatus in all respects similar to that described in relation to Embodiment "A" of the invention.

In order to direct the magnetic field emanating from the simple two pole/two face magnet formed by the cooperation of field coil 60 and solecore 2, to a single face magnet of multiple alternating north and south poles, a pair of dissimilar rotor pole units 39 and 40 are provided in accordance with details illustratively shown in FIGS. 20, 21 and 22.

In FIG. 21 a side view of a composite pole unit, consisting of north pole unit 39, and south pole unit 40 is in evidence. In FIG. 21 a front view (from the north pole unit's face) shows the configuration of the north pole unit as being in the form of a modified cross, the relationship of its secondary dimension, appearing in the form of a flat plate and bearing the designation "N" is evidenced in FIG. 20. In an assembled rotor, the north pole unit 39, would be centered about shaft 3, and secured to solecore 2 by securing screws 9. By referring again to FIGS. 20, 21 and 22 it will be seen that the rotor's south pole unit 40, is of a more complex structure, consisting of a disc section incorporating in substantial proximity to its periphery, a plurality of fingers or poles, said fingers or poles being in equal radial dispersement about the periphery of said disc and extending in the direction of the rotor's north pole unit, to the first point of intersection with same, whereat, said fingers are made to effect a 90° outward radial change of direction, bringing them into parallel alignment with the rotor's north pole as viewed in FIG. 20. Upon being centered with respect to solecore 2, the rotor pole unit 40 is secured to said solecore 2 with securing screws 9. By referring again to FIG. 21 it will be seen that both the north and south poles of the rotor as assembled, are in radial symmetry and configuration of the north pole unit 39 is such as to circumvent magnetic short circuiting to the fingers or poles of south pole unit 40.

In order to impart structural stability to the rotating elements of a machine of the conformity reflected in FIG. 14, an intermediate rotor support means has been provided, said rotor support means, shown in both FIGS. 14 and 28 comprises bearing support plate 58 and bearing 10, bearing support plate 58 being of disc conformity with bearing 10 being retained about its center. In function, the support element is located on the inside of casing assembly 42, substantially equidistant from the ends of said casing assembly, and is secured to said casing assembly 42, by a plurality of bolts 59, the threaded ends of which engage in an inwardly projecting flange forming an integral part of inner casing 66. Being so located and secured, and having bearing 10 encompassing shaft 62, it will be apparant that substantial structural stability has been imparted to the machine's rotating elements by the afore described components.

Also shown in FIG. 14 is a pair of end plate or end cap means 41, said means serving in main to integrate the rotating and static elements of a machine of Embodiment "B" conformity. It will be noted that a flange section is embodied in said means 41 for the purpose of facilitating the securing of said means 41 to casing assembly 42, and a bearing means 10, is retained about its center. By reference to FIG. 15 it will moreover be noted that a support foot for the purpose of supporting the machine's structure, or securing same to a base such as the floor of a building, has been integrated in end cap means 41. It should also be noted that when required, openings may be incorporated in the end cap means 41 for the purpose of bringing the terminals of the machine's output coils 46 to the outside of the machine.

Referring again to FIG. 14 and having described casing assembly 42, the rotor assemblies 38, intermediate rotor support means 58 and 10, shaft 62, stator iron 44, inductor coils 46, end caps 41 and means of supplying direct current power to the rotor's field coils 60, and having described the methods whereby the immediately afore listed components are located and secured in their relationship to each other, it will be seen that by moreover securing end plate means 41, together with end bearings 10 to casing assembly 42 by bolts 43, a funtional alternator/generator of Embodiment "B" conformity will have been constructed.

It is important to note that in assembling a machine of Embodiment "B" conformity as shown in FIG. 14, and in order to provide a return path for the magnetic flux eminating from the north pole of rotor assemblies 38, said rotor assemblies should be affixed to the shaft 62 in such manner that fingers or poles of opposite polarity are at all times in lineal alignment; or as otherwise expressed, opposing poles should at all times be coincident with the opposing ends of any magnetic iron "bundle" 44.

As in the instance of machines of Embodiment "A" conformities, rotors of divergent characteristics are adaptable to the basic alternator/generator of Embodiment "B" conformity as shown in main in FIG. 14, and substitutions as described in the following may be effected in order to achieve a certain condition of design requirement.

A spacer sleeve of non magnetic material as shown in FIGS. 7 and 8 is substituted for solecore 2, and is affixed to rotatable shaft 62 by securing screws 34, said securing screws also being of a non magnetic material. A permanent magnet of ring or sleeve conformity 35, suitably dimensioned and magnetized in the direction indicated thus "←M→" and being of a material such as Alnico VIII (but not necessarily restricted to same) is substituted for field coil 60 and is secured to spacer sleeve by tapered keys 36. In this modification to rotor assemblies 38 as shown in FIG. 14, rotor pole units 39 and 40 would remain unchanged, and said units would be secured to spacer sleeve 33 by securing screws 9. By the substitution of spacer sleeve 33 and permanent magnet 35 for solecore 2, all means for supplying direct current power to field coil 60 would be eliminated from function.

Another type of rotor highly suitable for providing the necessary magnetic field for an alternator/generator of Embodiment "B" conformity is shown in FIGS. 23 and 24. In this latter instance, a disc of non magnetic material 52 has a plurality of permanent magnets 55, of square or rectangular cross sectional geometry, approximating in said geometry and area the cross sectional geometry and area of the stator iron "bundles". Said permanent magnets 55 being longitudinally dimensioned in accordance with design conditions, and the individual permanent magnets 55 located in suitably sized openings arranged on a pitch circle substantially coincident with the pitch circle of the stator iron 44. The permanent magnets 55 are retained in their accommodating openings by securing screws 56, said securing screws being of non magnetic material. By referring to FIG. 24 it will be seen that the permanent magnets 55, are of an equal angular disposement about the face of disc 52 and are of alternating magnetic polarities.

In utilizing rotors of the type now described within the confines of an alternator/generator of Embodiment "B" conformity, the previously described rotors, shafting and brush gear components would be excluded from the assembly and replaced with permanent magnet type rotors 52, said rotors incorporating in their structure a hub and key as shown in FIGS. 23 and 24. In an operable installation, rotors 52, being located substantially in the area occupied by rotor pole units 39 in FIG. 14, would be affixed to a suitably dimensioned rotatable shaft 62 by means of key 53 and securing screw 54. Shaft 62 would be located and retained by bearing means 10 with said bearing means being retained in end plate 41. Upon securing end plates 41 to the casing assembly 42 by means of securing bolts 43, yet another variant of Embodiment "B" of the invention will have been constructed.

In FIGS. 34 and 35 details of yet another rotor pole unit 73 is evidenced, the said pole unit, constructed of a magnetic material, has been conceptually structured to cooperate with an electromagnet as formed by solecore 2 and field coil 60, shown in FIG. 6, and/or a permanent magnet 35, as shown in FIG. 8 in order to produce direct current electricity from a machine of Embodiment "B" conformity without resorting to output collector brushes. By examination of FIGS. 34 and 35, it will be noted that pole unit 73 is of modified disc conformity, having a plurality of equally spaced and geometrically and dimensionally equated "cut outs" extending inward from the periphery of the disc, and serving to define a plurality of outwardly directed fingers, the radial center lines of said fingers being of equal angular dispersement. In function as an electromagnetic type rotor, a pair of pole units 73, located within the confines of a machine of Embodiment "B" conformity, and placed substantially in the areas occupied by rotor pole units 39 as shown in FIG. 14, would be secured to solecore 2 by securing screws 9.

In this instance, solecore 2 (which would be secured to shaft 62 by securing screws 4) and field coil 60 would be of such longitudinal dimensional as to span the length of the stator iron "bundles" 44, plus the sum of the air gap dimension at both ends of the stator iron. In further consideration of the rotor pole units 73, it should be noted that the arc length of the fingers of said pole unit 73, as measured on a pitch circle coincident with the pitch circle at the center line of the stator iron, as viewed in FIG. 15, would be such as to ensure that at any given time, a minimum of 50% of the stator iron "bundles", as viewed in cross section from the air gap, would be covered by the said pole unit fingers. In an operating generator utilizing a rotor as last described, said rotor being supplied with direct current power to its field coil 60, in a manner as previously described herein, the rotor pole units 73, by the nature of their configuration, would create periodic variations in the intensity of the magnetic field as they are revolved, and thereby create an interaction with the stator iron 44 and the induction coils 46 of such nature as to result in the production of direct current electrical power.

In a modified version of the rotor as last described, and again with the purpose of generating direct current electrical power without resorting to collector brushes, a suitably dimensioned rotor sub-assembly of permanent magnet type, and comprising non magnetic sleeve 33, securing screws 34, sleeve or ring type permanent magnets 35, all as shown in FIG. 8 is substituted for solecore 2, securing screws 4, field coil 60 and all means of supplying said field coil 60 with direct current power. In an operating generator of Embodiment "B" conformity, a pair of rotor pole units 73 being secured to non-magnetic sleeve 33 by securing screws 9 would perform an identical function to that described for the electromagnetic type rotor as last dealt with herein.

In reviewing the means whereby magnetic flow is introduced to the stator iron of all variants of Embodiment "B" of the invention, as previously discussed, it will be noted that in all instances, rotors or rotor pole units have been located in rotatable circumstance at both ends of the stator iron "bundles" 44, with the purpose of such arrangement being to ensure a path of magnetic flux return and/or to maximize machine output. In the event, however, of a requirement for machines of more limited outputs and/or due to circumstances of manufacture or economics, an alternative method of obtaining flux return has been provided.

In FIG. 18 an alternative form of stator iron to that shown in FIG. 16 is in evidence. The iron "bundle" 48 shown in FIG. 18 is formed from laminates, retained in unitary assembly by non magnetic rivets 45 and is in all respects similar to iron "bundle" 44 except that one of its ends has been bent through 90° in order to form a figure of "L" shaped conformity. It will moveover be noted by again referring to FIG. 18 that a punched hole is in evidence in the shorter leg of the "L" shaped iron "bundle" 48, said hole being located in near proximity to the end of the said iron "bundle". In FIG. 27, the method of installing the modified iron "bundles" 48 in a single rotor machine is indicated. It will be noted that the shorter leg of the "L" shaped iron "bundles" 48 is turned inward towards the machine's axis and in all instances would be located at the end of the machine opposite to the rotor and/or brush gear. In FIG. 25 and 26 a flat ring of laminated magnetic iron 49 is indicated, said ring having a plurality of holes disposed about its face on a pitch circle coincident with the pitch circle established by the holes contained in the shorter leg of stator iron "bundles" 48 when installed in casing assembly 42 as previously described and as shown in FIG. 27. By cross reference of FIGS. 15 and 25 it will be noted that the number of holes contained in the laminated iron ring 49 is equal to the number of laminated stator iron "bundles" for a typical machine, thereby facilitating the affixment of the individual stator iron "bundles" 48 to the laminated iron ring 49 by locating bolts 50 and securing nuts 51 in the manner as shown in FIG. 27. Having secured the stator iron "bundles" 48 to the laminated iron ring 49 by means of bolts 50 and nuts 51, said bolts and nuts being of a non magnetic material, an adequate return path for the magnetic flux emanating from the machine's rotor will have been established without the incurrence of abnormal losses to residual magnetism.

As in the instance of Embodiment "A" of the invention, and in order to make available machines capable of providing a wide range of output conditions of voltage, current and frequency from a single machine whilst utilizing standardized components in its assembly, a method of modular extension as hereinafter described has been evolved for machines of Embodiment "B" conformity, and is an object of the invention.

In FIG. 29 a modification to casing assembly 42 as shown in FIG. 14 is indicated. The modification referred to is applicable to one end of casing assembly 42 only, in effect a casing assembly 57 as detailed in part in FIG. 29 would have the balance of its assembly in all respects similar to casing assembly 42 with said balance including in proximity to its longitudinal mid-section a means for receiving and securing an intermediate rotor support means, comprising bearing support plate 58 and bearing 10. In the modification as detailed in FIG. 29, the inner casing section, now enumerated 70, incorporates in close proximity to the end shown in FIG. 29, an inwardly projecting flange to which an intermediate rotor support plate 58 is secured by securing bolts 59, the said rotor support plate 58 having a bearing means 10 retained about its center. By again referring to FIG. 29, it will be noted that the outer casing section of casing assembly 57, said outer casing section now being enumerated 71, incorporates the following configuratory differences to a casing outer section 67 as shown in FIG. 14;

The flange portion of said outer casing section 71 has been extended longitudinally beyond the face of the stator iron 44 and a machine support foot (shown in greater detail in FIG. 30) has been incorporated as an extension of said flange section.

In order to increase the output capacity of a machine of Embodiment "B" conformity of modular extension, a selected rotor would be located and secured at an intermediate setting on an appropriately dimensioned shaft 47 or 62, and a casing assembly 57, complete with a pair of rotor support means comprising bearing support plate 58 and bearing 10, one said rotor support being located at the mid-section of casing assembly 57, and the other said rotor support means located as shown in FIG. 29, would be so positioned about the rotor and shaft assembly as to locate the rotor with one of its faces being separated from the stator iron 44, as shown in FIG. 29, by a minimal working air gap only. In the next step of assembling a machine of modular extension, a casing assembly 42, complete with a rotor support means comprising bearing support plate 58 and bearing 10, secured in the proximity of its mid-section, would be positioned about the as yet unenclosed portion of shaft 47 or 62, and casing assemblies 42 and 57 would now be secured in unitary assembly by securing screws 43. By performing this last described operation of assembly, the selected rotor as affixed to the machine's shaft would now have its pole faces separated from the faces of the stator iron "bundles" 44 as retained in casing assemblies 42 and 57 by a minimized air gap of equal dimension. In the final steps of assembling the major components of a machine of modular extension of Embodiment "B" conformity, a pair of rotors of similar characteristics to the one discussed in the immediate foregoing would now be secured to shaft 47 or 62, one being located at either end of the machine, and having their pole faces separated from the stator iron "bundles" 44 by a minimized air gap. A pair of end cap means 41, having bearing means 10 retained about their centers, would now be secured to the end flanges of casing assemblies 42 and 57 respectively, by securing screws 43, and a machine of modular extension will now have been constructed.

In the example of modular extension cited in the foregoing, it will be noted that a two stator/three rotor assembly has been discussed, with the rotors being of similar characteristics and the intermediate rotor obviously being of the two pole face type.

In an assembly as afore discussed, it would be apparent that the stator or casing assemblies 42 and 57 could obviously incorporate vastly divergent types of windings or coils, which in turn could be connected in various combinations to make available a wide variety of voltage and current characteristics.

Upon reflection on the method whereby modular extension of a machine of Embodiment "B" conformity can be effected, it would also be apparent that an assembly need not be limited to the two modules as used in the example cited, and that moreover a variety of rotors, including both permanent magnet and electromagnet types can be utilized in a single machine of modular construction or extension.

For instance, intermediate rotors (rotors located between casing assemblies or modules) of the two pole face type, having equated characteristics of field strength and pole numbers as discussed in the foregoing, could be replaced with twin rotor units, operating "back to back", with each rotor having divergent characteristics of field strengths, pole numbers and/or field source; i.e., electromagnet or permanent magnet, it would now be apparent that with such arrangements, a wide range of frequencies as well as voltages could be made available from a single machine of modular construction. Additionally, current characteristics from such machine could be widely divergent in nature, and could include direct current, in which case all or a portion of such direct current could be utilized to supply power to the field coils of any electromagnetic type rotors being incorporated in the assembly, and in an instance where the magnetic field utilized to produce such direct current eminated from a rotor or rotors of permanent magnet type, an alternator/generator characterized in part by rotors of the electromagnetic type but which place no dependency on a source of direct current for field excitation outside of the said alternator/generator would have been constructed.

A further feature of the invention as applicable to Embodiment "B" of same concerns a means whereby a liquid or gaseous coolant can be readily and safely applied to the output windings of a machine of Embodiment "B" comformity.

Because of the unique structure of the stator of a machine of Embodiment "B" conformity, wherein the stator iron and output coils are contained within the cavity formed between two cylinders, located one within the other, with said cylinders being equally spaced apart, a means whereby a coolant can be contained in flowing proximity to said stator iron and output windings can be effected in the following manner:

A pair of annular rings (not shown) of non-magnetic material and approximately ⅛" thick have an outside diameter substantially equal to the inside diameter of the outer cylinder and an inside diameter substantially equal to the outside diameter of the inner cylinder, and have a plurality of openings punched or otherwise cut on a pitch circle substantially coincident with the mean diameter of said annular rings, said openings being coincident in quantity, geometry and cross sectional dimension with the quantity, geometry and cross sectional dimension of the stator iron "bundles" 44 are utilized as the basic structural means for forming an end closure between the inner and outer stator casing sections at both ends of the stator or casing assemblies 42 and/or 57.

In the first step of preparing a stator for operation, featuring direct cooling of its windings, the sub-assemblies comprising the stator iron "bundles" 44 and induction coils 46 would be enclosed in a thin envelope of epoxy prior to assembly and securing within the stator casing assemblies 42 or 57. Having located and secured the stator iron and induction coils as last described, the previously discussed annular rings would then be located (at both ends of a stator section) within the openings between the inner and outer casings, and with the ends of the stator iron "bundles" 44 projecting approximately ¼" beyond the outside face of the said annular rings which would then be tack welded to the inside and outside casing sections. Having secured the closure rings to the inner and outer casing sections as last described, all openings in the basic end closure as now effected would be sealed with an epoxy, as would all areas of potential fluid leakage at stator iron securing screws 65. In an instance where stator iron "bundles" 48 are to be installed in a machine requiring direct cooling of its output windings, the annular ring to be used for forming the basic end closure structure at a stator end of the type shown in FIG. 27, would be made in two sections, having a circumferential seam located on its mean diameter. After having installed the two sectional annular ring as last described, both sections would be structurally secured by tack welding, and all areas of potential coolant leakage sealed with an epoxy.

Having obtained a fluid tight stator cavity in the manner as illustratively afore described, and noting by reference to FIG. 32 that openings incorporated in casing rib members 68 would allow circulation of a coolant about the stator iron/induction coil assemblies, it would now require only a fluid inlet connection to be provided, preferably on the lower side and near one end of the stator outer casing 67 or 71 and a fluid outlet connection to be provided at an opposing side and end of said outer casings 67 or 71, and a liquid or gas cooled stator of Embodiment "B" conformity would now have been constructed.

As in the instance of the cooling system incorporated in Embodiment "A" of the invention, the cooling system of Embodiment "B" can readily utilize coolants in either gaseous or liquid states provided due attention is rendered to such factors as temperature, velocity and flow volume.

Yet another object of the invention involves a method whereby the laminated iron forms 15, 44, 48 and 49 employed in the magnetic circuit of the stators of machines of Embodiment "A" and "B" of the invention are replaced by forms of unitary construction with said unitary forms being manufactured by the processes of casting, extruding and/or pressing and sintering.

In a particular type of casting or extruding process, a liquid polymer would be mixed with a ferritic powder, such powder having chemical properties suitable for the manufacture of magnetic iron, the mixing process would be such as to obtain a required dispersement of the ferritic powder in a minimum quantity of liquid polymer, thereby minimizing the reluctance of the magnetic form. Upon completion of the mixing process, the "green" mixture would be molded or extruded to the desired finished shape or form.

In a further type of casting, ferritic powders being at a temperature below their melting point are combined with certain molten non-magnetic materials at selected predetermined temperatures whereupon the resultant fluidic mass is molded to the required form.

In producing magnetic iron forms by the process of pressing and sintering, a selective mixture of suitably granulated ferritic powder, non-magnetic metals powder and selected ceramic oxides of appropriate granular dimension and chemical properties, said oxides and non-magnetic metals having in final purpose the granular separation of the ferritic powder in order to minimize losses due to residual magnetism in a magnetic circuit, would be formed to a finished shape under high pressure and then fused to an agglomerate by sintering.

To those skilled in the alternator/generator art, and in particular those being aware of the problems associated with complex laminated iron forms, the advantages offered by the afore described alternative methods of constructing magnetic forms would be manifest.

In considering the various concepts as set forth in this specification and the accompanying drawings, it will be apparent that in the interests of clarity and brevity only the more salient features of the invention have been illustratively described herein, and many modifications to the details shown and described may be readily effected. For instance, rotor pole numbers and shapes could be of a wide variety and output coils could be connected in a variety of combinations in order to achieve a wide range of output voltages and current conditions. The structural elements of the machine as illustratively shown could also be subject to many modifications.

I therefore state that having made the disclosure as set forth herein, including certain mechanical arrangements as shown in the drawings, which are merely indicative of certain approaches contemplated by my invention, and being aware of the many modifications likely to appear to those skilled in the art, that my invention is not limited to the embodiments illustrated and described herein, but further includes all modifications and variations as may fall within the scope of the following claims.

What is claimed is,

1. An electrical generator comprising:
  (a) a generally cylindrical casing including two radially spaced-apart walls,
  (b) a plurality of individual elongated magnetic cores located between the casing walls, each core having an electrical coil wound around it, the cores and coils defining the stator of the generator,
  (c) a rotor within the inner of the casing walls, the rotor being rotatable about an axis parallel to the axis of the casing, the rotor having a plurality of radially projecting magnetic pole pieces, the magnetic pole pieces extending into axial alignment with the magnetic cores and being axially spaced from the ends of those cores,
  (d) whereby as the rotor rotates the magnetic cooperation between the pole pieces and cores generates electric current in the stator coils on the cores.

2. An electrical generator as defined in claim 1 including a plurality of axially extending elongated ribs between and interconnecting the two casing walls.

3. An electrical generator as defined in claim 2 wherein the ribs are circumferentially spaced apart, a magnetic core being located between each two successive ribs.

4. An electrical generator as defined in claim 1 wherein the casing walls define between them an annular conduit, and means for passing a cooling fluid through the conduit to cool the stator.

5. An electrical generator as defined in claim 4 including a plurality of axially extending elongated ribs between and interconnecting the two casings, each rib extending radially across the conduit, and the ribs having holes in them to permit circulation of the cooling fluid through them to the cores and windings of the stator.

6. An electrical generator as defined in claim 1 wherein the rotor comprises a magnet having two axially spaced apart poles, a plurality of pole pieces projecting radially from a first of the poles, the first pole pieces being circumferentially spaced apart, a plurality of fingers extending from the second pole toward the first pole, a plurality of second pole pieces projecting radially from the fingers, the second pole pieces being in the spaces between the first pole pieces.

7. An electrical generator as defined in claim 6 wherein the fingers extend in an axial direction, each finger having a radially outward 90° bend near its free end, the second pole pieces being defined by the radially outward portions of the fingers beyond the 90° bends.

8. An electrical generator as defined in claim 6 wherein at one end of the stator all the core ends lie in a single plane perpendicular to the casing axis, and all the pole pieces lie in a single plane parallel to, and axially spaced from, the plane containing the core ends.

9. An electrical generator as defined in claim 6 wherein the rotor includes a core carrying an electric coil and a disk at each end of the core, the first pole pieces being formed in the edge of one disk, and the fingers and second pole pieces extending from the other of the disks.

10. An electrical generator as defined in claim 1 wherein each magnetic core is a stack of magnetic laminates.

11. An electrical generator as defined in claim 10 wherein each magnetic core has a rectangular cross-sectional shape.

12. An electrical generator as defined in claim 10 wherein each magnetic core has a radially inward 90° bend at one end to give the core an L-shaped configuration having a long leg and a short leg, the long legs of the cores extending axially between the casing walls and the short legs extending radially inwardly, and a laminated ring surrounding the casing axis and fixed to each of the short legs.

13. An electrical generator as defined in claim 1 wherein each magnetic core is a molding of iron powder and a polymer.

14. An electrical generator as defined in claim 1 wherein each magnetic core is a sintered article of iron powder, non-magnetic metal powder, and a ceramic oxide.

* * * * *